US012016492B2

(12) United States Patent
Liu

(10) Patent No.: US 12,016,492 B2
(45) Date of Patent: Jun. 25, 2024

(54) SPICE OR OTHER SUBSTANCE GRINDING APPARATUS WITH INTERCHANGEABLE SUBSTANCE CONTAINERS

(71) Applicant: Alex L Liu, Beaverton, OR (US)

(72) Inventor: Alex L Liu, Beaverton, OR (US)

( * ) Notice: Subject to any disclaimer, the term of this patent is extended or adjusted under 35 U.S.C. 154(b) by 0 days.

(21) Appl. No.: 17/074,615

(22) Filed: Oct. 19, 2020

(65) Prior Publication Data

US 2021/0113021 A1  Apr. 22, 2021

Related U.S. Application Data

(60) Provisional application No. 62/923,535, filed on Oct. 19, 2019.

(51) Int. Cl.
*A47J 42/50* (2006.01)
*A47J 42/06* (2006.01)
*A47J 42/46* (2006.01)

(52) U.S. Cl.
CPC ............... *A47J 42/50* (2013.01); *A47J 42/06* (2013.01); *A47J 42/46* (2013.01)

(58) Field of Classification Search
CPC .. A47J 42/00; A47J 42/02; A47J 42/06; A47J 42/10; A47J 42/36; A47J 42/46; A47J 42/50

See application file for complete search history.

(56) References Cited

U.S. PATENT DOCUMENTS

| 7,377,458 | B1 * | 5/2008 | Wu | A47J 42/50 241/146 |
| 2005/0023389 | A1 * | 2/2005 | Wu | A47J 42/04 241/169.1 |
| 2018/0178367 | A1 * | 6/2018 | Benson | B25F 3/00 |

FOREIGN PATENT DOCUMENTS

| CN | 102728444 A | * | 10/2012 | |
| CN | 108543565 A | * | 9/2018 | A47J 42/00 |

OTHER PUBLICATIONS

English translate (CN108543565A), retrieved date Aug. 13, 2022.*
English translate (CN102728444B), retrieved date Aug. 14, 2022.*

* cited by examiner

*Primary Examiner* — Matthew Katcoff
*Assistant Examiner* — Mohammed S. Alawadi
(74) *Attorney, Agent, or Firm* — Steven J. Sullivan

(57) ABSTRACT

Actuators and interchangeable cartridges that achieve a grinding or grating different substances without cross-contamination. The actuators and cartridges are disclosed are uniquely designed for ready push-on, push-off mounting in a manner that affords proper alignment of the cartridge in the actuator. The cartridges may include a container portion and a mount portion, each with a grinding element arranged at an output thereof. As the container and mount portions move relative to one another, their respective grinding elements move, achieving a grinding or grating of substances in the container. Various embodiments and variations are disclosed.

30 Claims, 9 Drawing Sheets

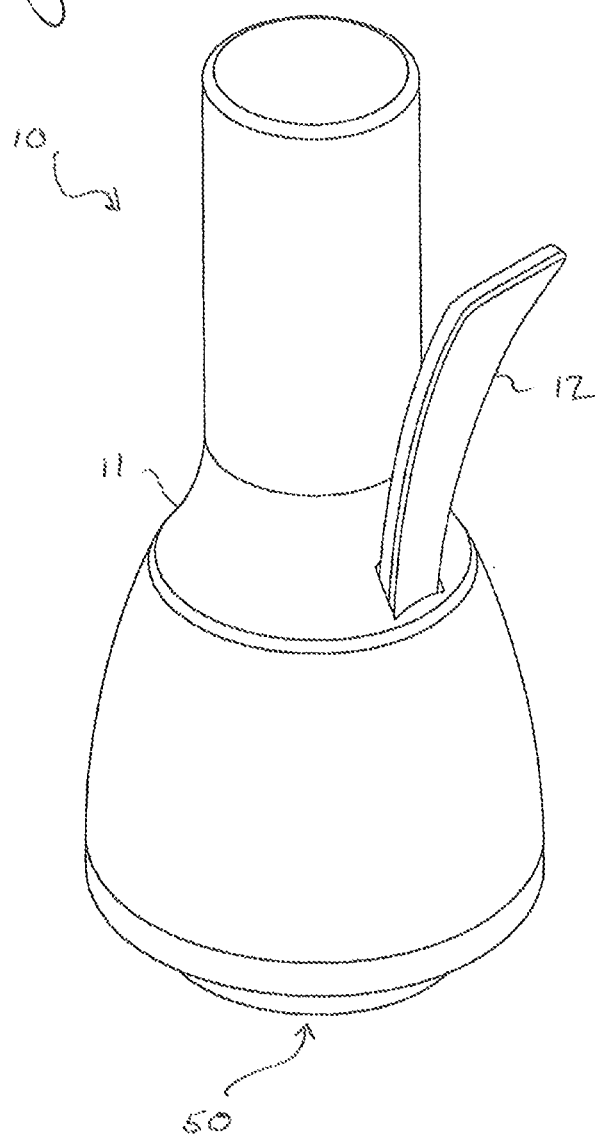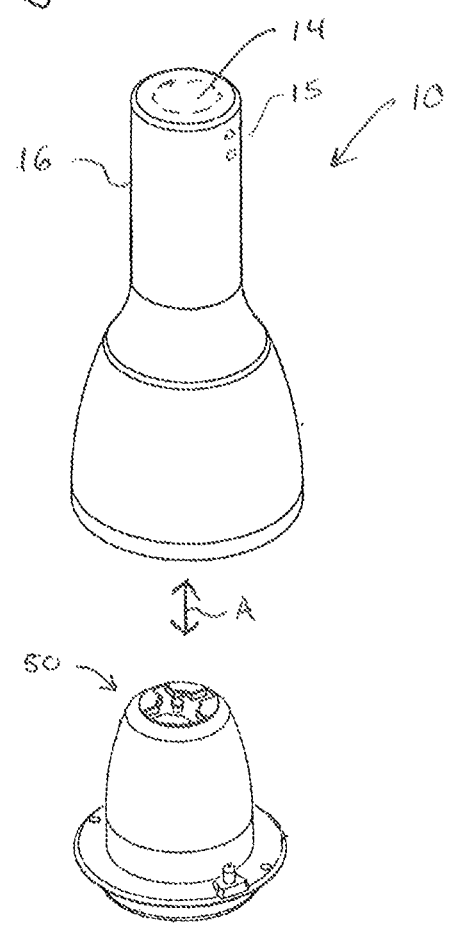

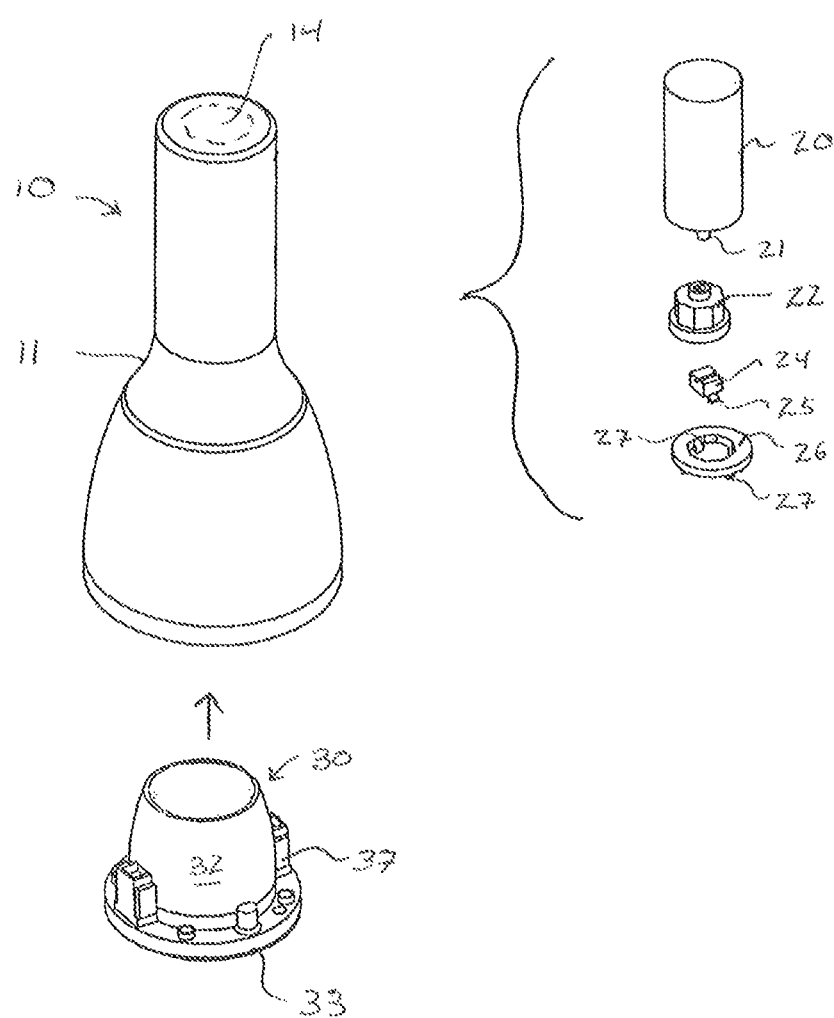

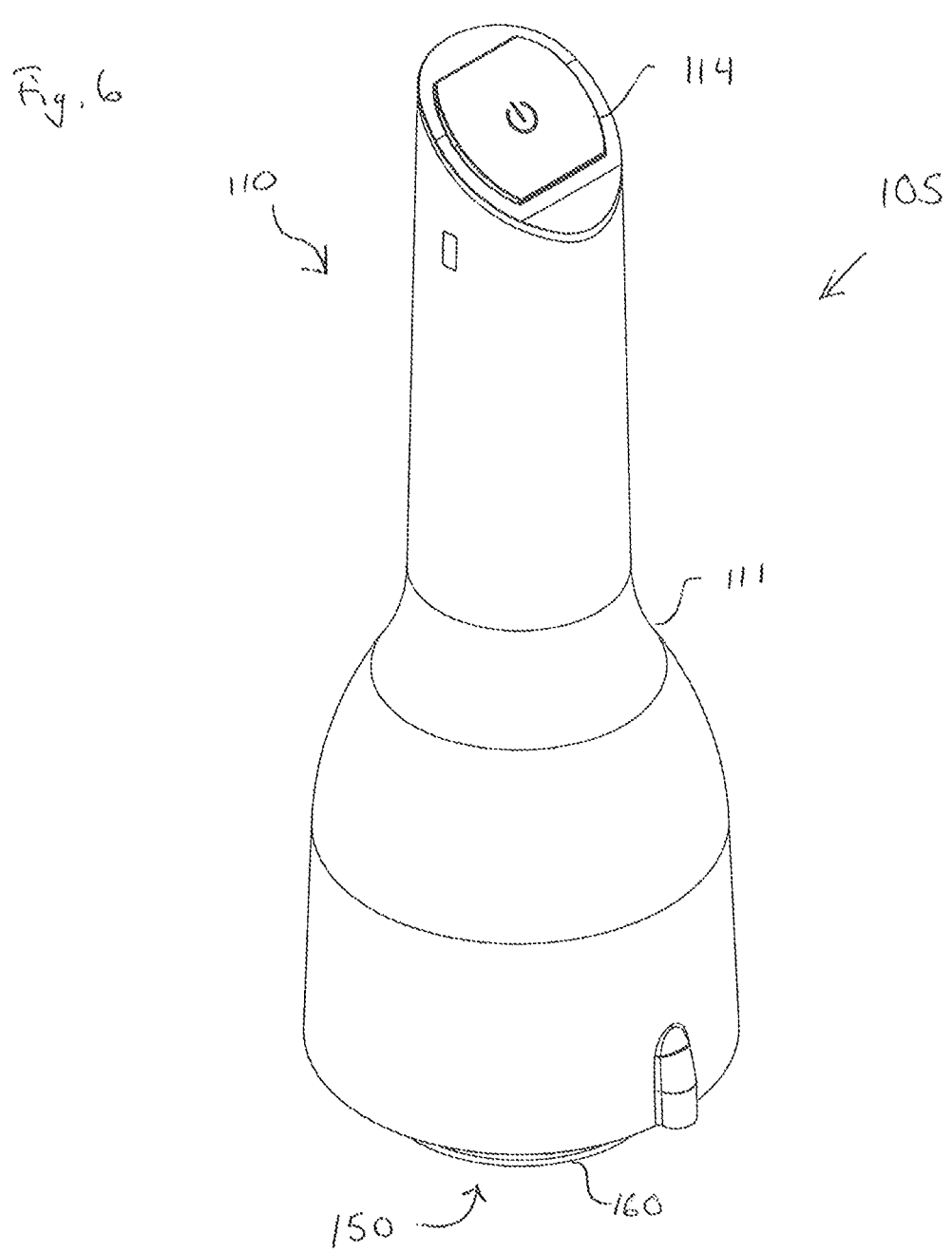

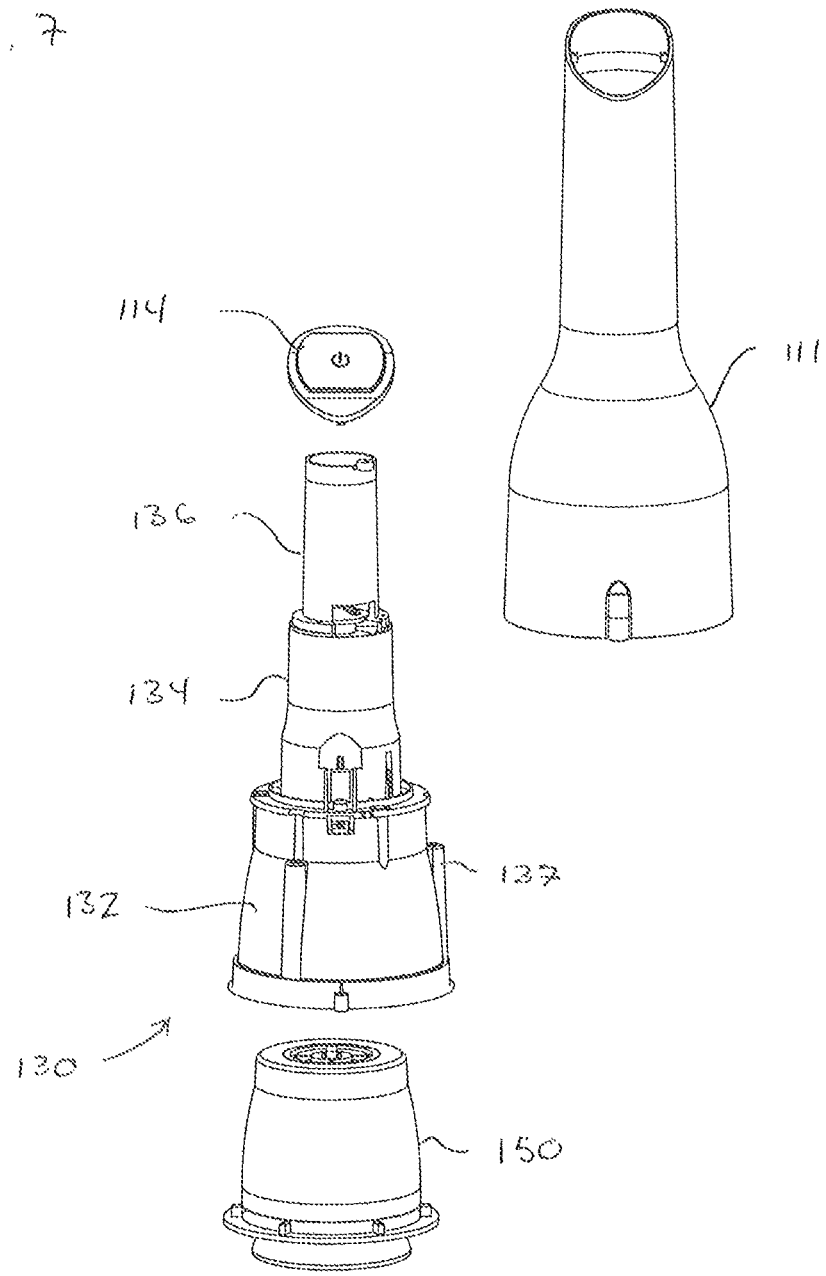

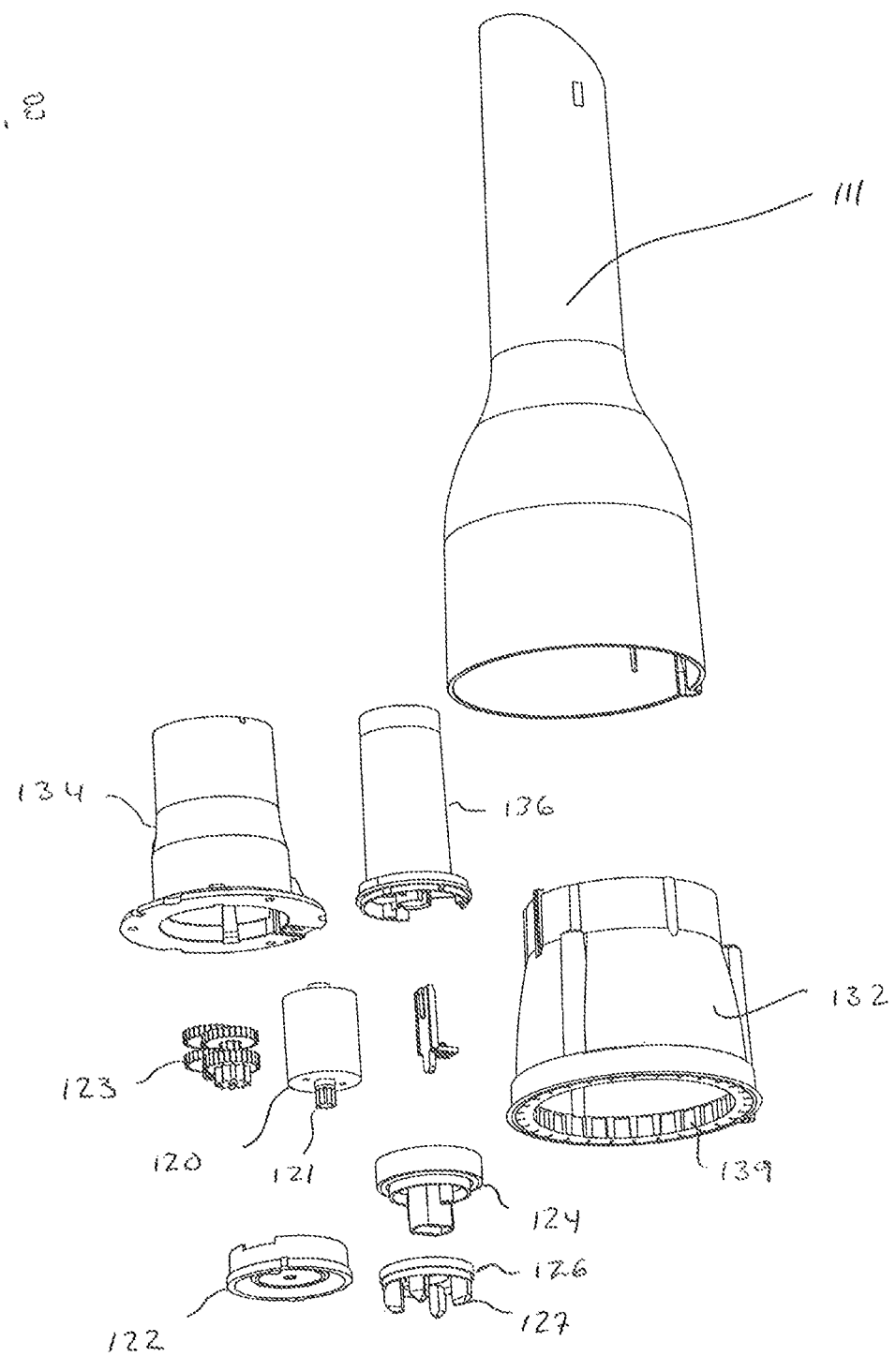

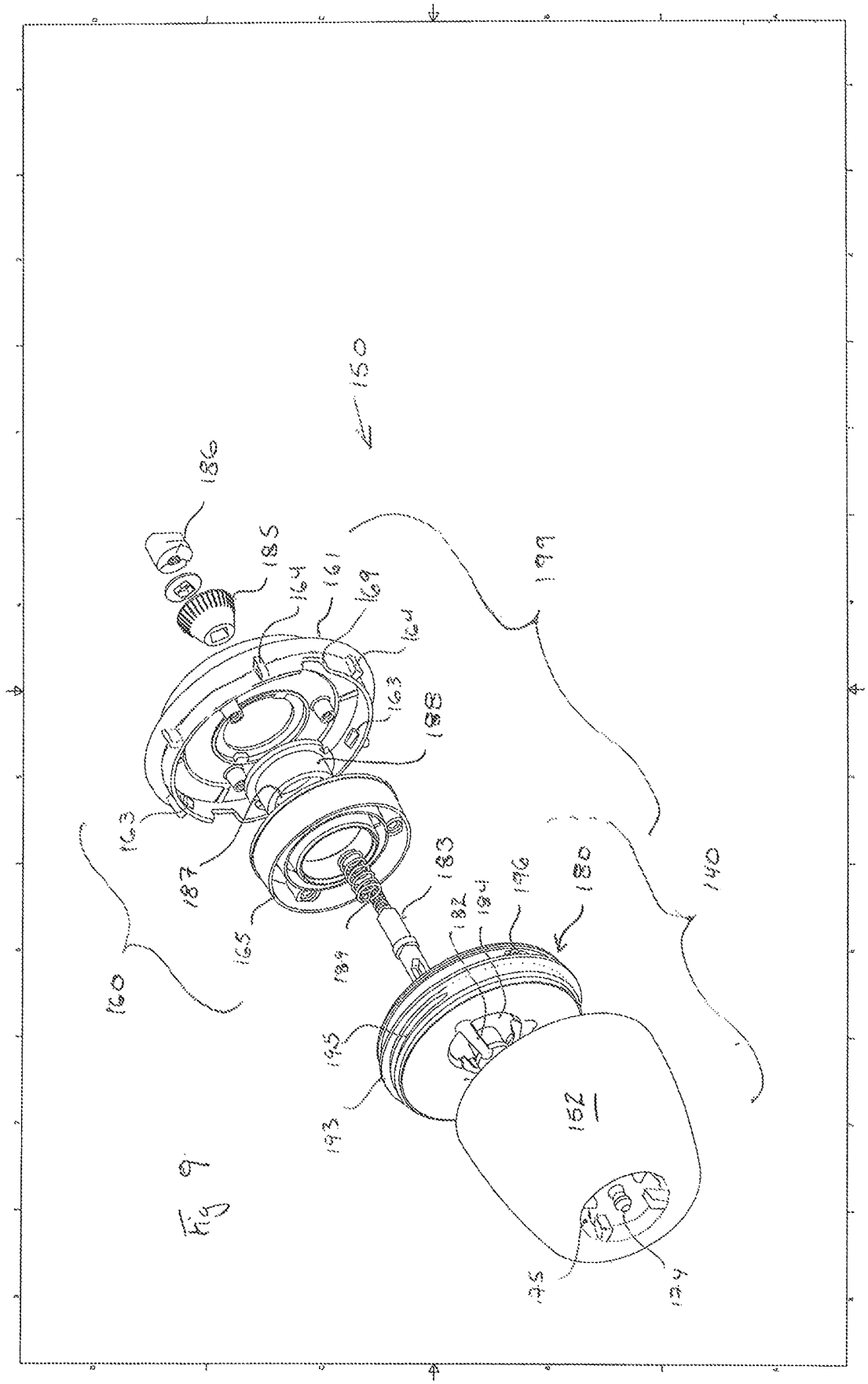

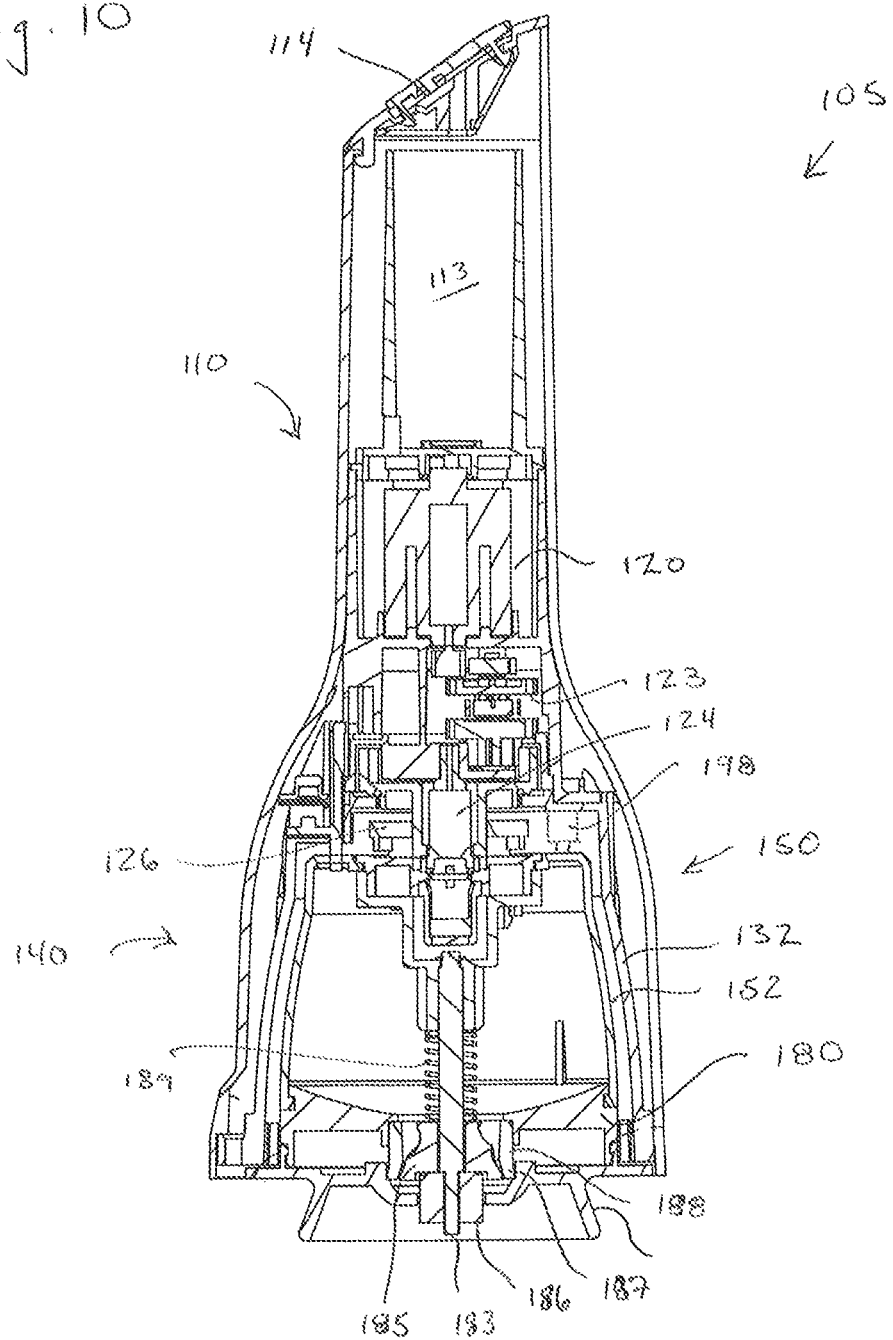

SPICE OR OTHER SUBSTANCE GRINDING APPARATUS WITH INTERCHANGEABLE SUBSTANCE CONTAINERS

CROSS-REFERENCE TO RELATED APPLICATIONS

This application claims the benefit of U.S. Provisional Application No. 62/923,535, filed Oct. 19, 2019, and having the same title and inventor as above.

FIELD OF THE INVENTION

The present invention relates to spice "grinders" and "mills" and related devices that grind, grate, abrade or otherwise render a larger form of a substance into smaller pieces. More specifically, the present invention relates to spice grinders or mills (or related devices) with interchangeable containers that afford ease of use and grinding of different substances without cross-contamination, among other benefits.

BACKGROUND OF THE INVENTION

Several spice grinding devices are known in the art. They include manual devices (for example, rotary pepper mills) and automated grinders. Automated grinders tend to be relatively large, i.e., not handheld, and require plugging into an electrical socket. These grinders are typically used to grind large quantities of the same substance, and when used with multiple substances require meticulous cleaning between use to avoid cross-contamination.

Fresh ground spices add much to a culinary or beverage drinking experience. Accordingly, various handheld spice grinding devices have been developed. Many of these are manually operated.

As people get older, however, or develop difficulty using their hands (arthritis, accident, etc.), manual operation can become difficult. Furthermore, in restaurant settings, where repeated grinding may take place, it is beneficial to automate grinding to reduce injury or fatigue caused by repetitive movement.

A disadvantageous aspect of current spice grinders is that they do not afford the ready grinding of different spices, without extensive cleaning, whether manual or automated. Another disadvantage is that they do not afford interchangeability of spice cartridges. Further, they are not sufficiently light-weight or appropriately configured for ready one hand operation.

A need thus exists for a grinding arrangement, whether manual or automated, that affords the ready grinding of different spices without cross-contamination. A need also exists for easy interchangeability of spice holding containers (in part, to eliminate the need to clean components between uses). In addition, needs also exist for a grinding arrangement that is easy to hold and operate with one hand, and that can be made in a cost-effective way.

SUMMARY OF THE INVENTION

Accordingly, it is an object of the present invention to overcome the shortcomings of the prior art.

It is another object of the present invention to provide a spice (or other substance) grinding or grating apparatus, method and system that affords grinding of different spices without cross-contamination (even when not cleaned between uses).

It is also an object of the present invention to provide easy mounting and release (i.e., interchangeability) of containers holding a substance to be ground.

It is yet another object of the present invention to provide automated grinding, and preferably in a lightweight, handheld arrangement.

And, it is yet a further object of the present invention to provide interchangeable cartridges that are easily and efficiently filled with a substance to be ground.

These and related objects of the present invention are achieved by use of a grinding system, apparatus, and/or method with interchangeable substance holding containers as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 1 and 2 are perspective views of one embodiment of a grinding or grating arrangement or system with a cartridge mounted in the actuator and not mounted in the actuator, respectively, in accordance with the present invention.

FIG. 3 is an exploded view of the actuator of FIGS. 1-2 while

FIG. 6 is a perspective view of another embodiment of a grinding or grating arrangement or system having an actuator and interchangeable cartridges in accordance with the present invention.

FIG. 7 is an exploded view of components in the arrangement or system of FIG. 6.

FIG. 8 is an exploded view of the actuator of FIG. 6 while FIG. 9 is an exploded view of the cartridge of FIG. 6.

FIG. 10 is a cross-sectional view of the arrangement or system of FIG. 6.

DETAILED DESCRIPTION

Figure 4:
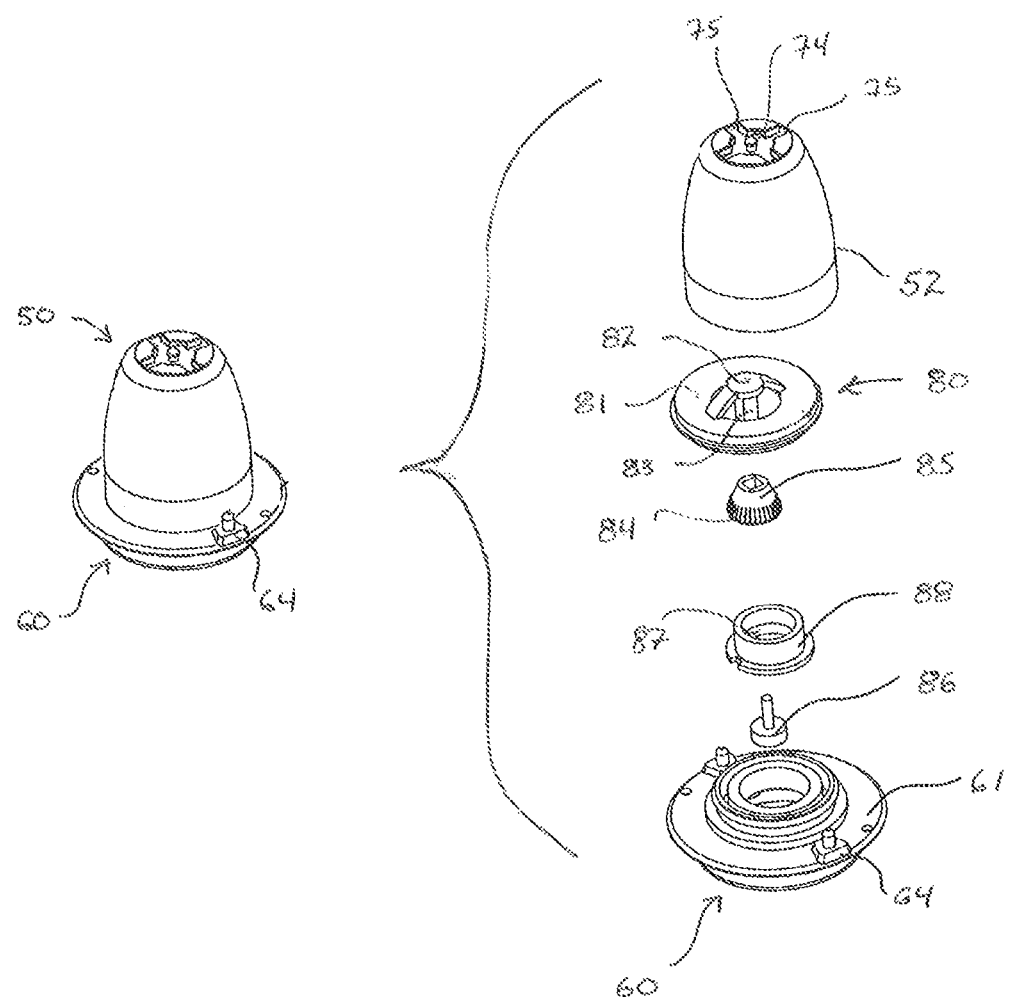
FIG. 4 is an exploded view of the cartridge of FIGS. 1-2.

Referring to FIG. 1, a perspective view of one embodiment of a spice grinder arrangement or system 5 in accordance with the present invention is shown. While FIG. 1 illustrates an automated grinder system, it should be recognized that features of the present invention may be realized in a non-automated, i.e., manual, grinder. It should also be recognized that for purposes of teaching the present invention, the words "grinder" and "mill" have largely the same or a similar meaning. For example, there may be a preference for one or the other depending on geographic location or culture, etc.

System 5 may include an actuator 10 and inter-changeable spice cartridges or "pods" 50. Cartridge 50 includes a container that holds the spice or other substance to be ground and a grinding or grating structure (at least in part) this is effective for processing the substance in the container. FIG. 1 illustrates cartridge 50 mounted within actuator 10, while FIG. 2 illustrates these components separate from one another. Arrow A illustrates the movement of a cartridge into and out of the actuator. On-off control 12 may be implemented as a lever 12 (FIG. 1) or an on-off button 14 or via another actuator control mechanism. Indicator lights 15 may indicate on-off, battery level, warnings, or other conditions and/or parameters.

Cartridge 50 holds material to be ground. This material may be spice, spice blend, salt, pepper, dried herbs, dried fruit, nuts, seed, or other. Special grinding elements, blades and/or other raw material abrading structure may be used for grinding substances that are larger, harder or have a different density or viscosity, etc., such as nutmeg, cinnamon, hard cheese or others. Furthermore, a bias mechanism may be use to push a larger item, a nutmeg nut, toward a grinding or grating element (e.g., used in instances where gravity alone may be insufficient to put the item to be ground in contact with a grinding/grating element). In such an embodiment, it may be that only one grinding or grating elements is needed, preferably provided in a modified mount assembly.

In addition, the present invention may be used in beverage preparation, bake good decorating, arts and crafts, and in various other situations where it is desired to grind a substance, and particularly when multiple different materials need to be ground, hence benefitting from cartridge interchangeability. While described herein primarily for use with food (e.g., edible substances), it should be recognized that the teachings of the present invention are applicable to any situation where it is desired to readily grind, grate or otherwise abrade different substances and without cross-contamination.

In the text below, the word spice may be used as the contents of the cartridge though it is to be understood that this use is for pedagogical purposes and thus may represent the contents of the cartridge generally, whatever that contents might be, i.e., any material to be ground, grated or otherwise reduced to smaller pieces, whether technically a spice or not.

The interchangeability of system 5 permits use of multiple cartridges with one actuator, each cartridge holding a different substance to be ground. In use, the actuator is placed over the cartridge and pushed down until the cartridge is engaged. In one embodiment, the mounting assembly is a push-on, push-off arrangement that affords easy mounting and release. Push-on, push-off attachment mechanisms are known in the art.

To begin grinding, a cartridge is appropriately positioned within actuator 10 and trigger 12 is squeezed or button 14 pushed which delivers electricity to motor 20 that drives a drive disk and ultimately grinding element 85. Note that use of an on-off button 14 at or near the top of actuator shaft 16 allows a user to turn the device off and on with their thumb while maintaining a firm grip on the actuator with their fingers, further facilitating one-hand operation.

FIG. 3 is an exploded view of actuator 10. FIG. 4 is an exploded view of cartridge 50.

Actuator 10 and cartridge 50 are uniquely designed such that the two grinding elements 85,87 move rotationally relative to one another. Grinding element 85 is driven by the drive motor while grinding element 87 is held stationary, the relative movement of the two parts achieving a grinding of a substance in between. Note that while grinding element 85 is shown above grinding element or surface 87, this is due to the "exploded" perspective of the figure and when assembled, wedge 85 nests or aligns within surface 87 (as shown in other figures).

FIG. 3 illustrates that actuator 10 may include a motor 20, mount 22, clamp 24 (part of the push on-off mechanism), and drive disk 26 with teeth 27. When activated, motor 20 spins shaft 21 which spins mount 22 and disk 26 with teeth 27. Teeth 27 engage recesses in a top portion of the cartridge and spin the container portion of the cartridge. Releasable latch mechanism 24 preferably includes two opposing L-shaped arms 25 (only one of which is visible in the perspective view of FIG. 5).

Actuator 10 may include a lining 30. This lining is secured within the actuator housing 11 and, in use, receives cartridge 50. Lining 30 has a shape complementary to the cartridge which serves to guide the cartridge into proper engagement with the drive disk 26, clamp 24 and anti-rotation structure 39 (discussed below). Lining 30 may include a shell 32, a rim 33, and mount structures 37. Structures 37 may aid in mounting lining 30 to housing 11 and provide space for a light and/or one or more sensors, such as an output sensor or particle size sensor or other sensor or feature. Note that an output sensor could detect when the cartridge is empty or jammed and a particle size or quantity sensor could detect volume output (i.e., "half-teaspoon," which would assist in following recipes).

FIG. 4 illustrates that a cartridge 50 may include a cover 52, a lid assembly 80, and a mount assembly 60. The term "lid" is used with assembly because it acts in some capacity (in concert with other components as discussed herein) as a seal or lid to hold material within cover 52. During filling, cover 52 is positioned with the open end up (the reverse of FIG. 4), filled with a material to be ground and then lid assembly 80 is secured thereto, either fixedly or releasably to allow refill. Together, the cover and lid assembly 80 define an interior volume for holding material to be ground and may viewed collectively as container 40.

Provided near a top of cover 52 are a mounting protrusion 74 and drive recesses 75 (that work in concert with latch 24 and drive disk 26, respectively).

Lid assembly 80 preferably has a sloped surface 81 that directs material toward centrally located grinding elements 85,87, a support bridge 82, a shaft 83, a rotary grinding wedge 85 that is actuated by shaft 83, and a pin 86 that couples the grinding wedge 85 to the shaft.

Mount assembly 60 preferably includes a grinding ring (or annular member) 88 on which grinding surface 87 is formed. Grinding surface 87 is positioned adjacent or generally opposite teeth 84 of grinding wedge 85.

Wedge 85 and surface 87 are a grinding element pair, configured for movement of wedge 85 relative to surface 87 to achieve a grinding of substances therebetween. Accordingly, surface 87 may be textured or otherwise formed to complement wedge 85 and enhance grinding or grating efficiency. Elements 85 and 87 may be tailored for a given substance to be ground, and hence may take different forms depending on what that substance is. Various grinding and grating element arrangements are known in the art and may be implemented herein without departing from the present invention. As shown in FIG. 4, surface 87 may be substantially smooth, offering resistance opposite "toothed" wedge 85.

In use, with a cartridge 50 in actuator 10, protrusions 64 contact recesses 39 in lining 30 that prevent rotation of the mount assembly, thereby allowing the cover and lid assembly (i.e., the container 40) to rotate relative to the mount assembly 60 and thus wedge 85 to rotate relative to grinding surface 87.

Figure 5:
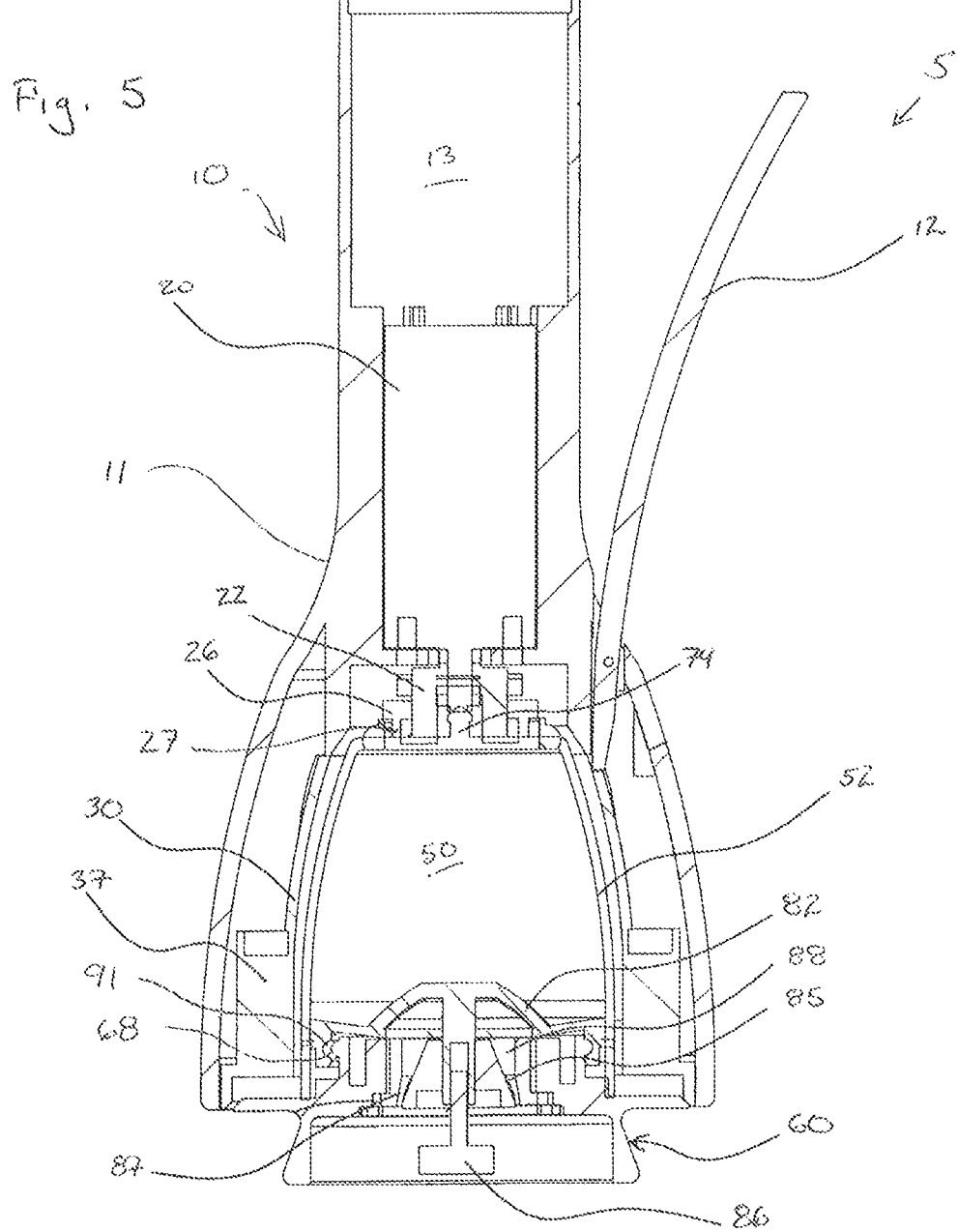
FIG. 5 is a cross-sectional view of the arrangement or system of FIG. 1.

Referring to FIG. 5, a cross-sectional view of a cartridge 50 inserted into actuator 10 is shown.

When mounted, teeth 27 on drive disk 26 (FIG. 3) fit within recesses 75 of the cartridge. Similarly, protrusion pin 74 contacts the latch mechanism with enough force to cause the latch arms (perpendicular to the cross-sectional plane of FIG. 5 and hence not visible) to be triggered downward and inward under the head of protrusion 74 to thereby hold the head and hence the cartridge within the actuator. This is secure retention yet with low friction in rotation.

Cover 52 fits within lining 30 with sufficient clearance that the housing may spin without rubbing the shell. Mount assembly 60 includes an annular flange or ring 68 configured to fit within a complementary recess in mount assembly 60 for rotary movement of lid assembly 80 relative mount assembly 60 and, hence, wedge 85 relative to surface 87. Ground product exits cartridge 50, and thus container 40, through the gap between (and defined by) wedge 85 and surface 87.

Pin 86 can be adjusted to vary the opening between the grinding elements 85,87 and thereby determine the maximum particle size output from the cartridge.

FIG. 5 also illustrates a cavity 13 for a battery. Various batteries may be used without departing from the present invention, including but not limited to, rechargeable batteries and those which can be charged via USB or other low voltage mechanisms.

Referring to FIG. 6, a perspective view of another embodiment of a grinder arrangement or system 105 in accordance with the present is shown.

System 105 is similar to system 5 discussed above, yet has other features and/or advantages. System 105 includes an actuator 110 and cartridges 150 (that may be interchangeably inserted into the actuator). FIG. 6 illustrates the actuator with on-off push button 114 and a cartridge inserted therein (only the bottom of which is visible). Generally, the reference numerals used to describe system 105 have the same last two digits as corresponding reference numerals (i.e., components) in system 5.

FIG. 7 illustrates actuator lining 130 removed from housing 111. Lining 130 has a three-part structure (136,134,132) for housing the battery, motor and cartridge, respectively. In this embodiment, protrusions 137 may have screws inserted through them to mount lining 130 to housing 111. Cartridge 150 inserts into the lower lining section 132. On-off button 114 is also shown.

Referring to FIG. 8, components in the interior of actuator 110 are shown. These may include battery lining 136, motor lining 134 and cartridge lining 132. Motor 120 has a drive shaft 121 that drives a gear mechanism 123 that affords different drive speeds. Mount 122 holds a drive disk 126 having teeth 127. When assembled, releasable cartridge clamp mechanism 124 is positioned between teeth 127 for releasably clamping to pin 174 on the top of the cartridge 150 (shown in FIG. 5, latch arms descending below the head of pin 174). Teeth 127 aligned in drive recesses 175 (in a manner similar to teeth 27 fitting into recesses 75).

FIG. 9 is an exploded perspective view of one embodiment of cartridge 150. Cover or shell 152 (with the mounting protrusion and drive recesses) is mounted to lid assembly 180 to form container 140 (similar to container 40) and define a volume or chamber in which a substance to be ground is stored. A support bridge 182 holds drive shaft 183 at a central opening 184. A mounting rim 193 clips into container securing protrusions 163 (arranged circumferentially in the mount assembly) to secure the container to mount assembly 160 in a manner that allows easy rotation of the container relative to the mount assembly.

Lid assembly 180 may have threads 195 for screwing into complementary threads in the interior of cover 152. As shown in FIG. 9, the lid assembly and mount assembly each have a surface configuration, a stop recess 196 and a notch 169, respectively, that aids in release or mounting of the cover. When aligned, a user may insert an item (spoon handle, knife, screwdriver) through the notch into the stop recess and prevent the lid assembly from turning, relative to the mount assembly, thus allowing a user to hold the mount and lid assemblies and screw-off or screw-on cover 152, for example, for refilling or initial filling.

Similar to the system 5 above, the drive shaft 183 turns grinding wedge 185 such that it rotates relative to mount assembly 160 and grinding surface 187. Nut 186 is attached to the distal end of shaft 183. Movement of nut 18 adjusts the spacing between wedge 185 and the annular angled grinding surface 187. A spring or other bias mechanism 189 may be provided to bias wedge 185 towards being "open," to avoid accidental clogging.

Mount assembly 160 may include container securing protrusions 163, spacer 165, grinding ring 188 that supports grinding surface 187, and base 162. Annular rim 161 extends laterally therefrom and supports protrusions 164 that fit within recesses 139 (FIG. 8) to prevent rotation of mount assembly 160 when container 140 is rotated.

FIG. 10 is a cross-sectional view of system 105 with a cartridge 150 mounted within actuator 110. The position of nut 186 and wedge 185 on shaft 183 can be seen as can the position of wedge 185 relative to annular angled surface 187. It can also be seen that wedge 185 has a more sculpted exterior surface compared to the ridges of element 85 (or element 185 as configured in FIG. 9) and a majority of the bias member 189 is within container 140.

Cover 152 is configured with lining 132 to afford rotation of cover 152 without contact or interference from lining 132. Cartridge 150 is preferably configured for easy push-on, push-off releasable mounting/dismounting to/from actuator 110 in a manner similar to the releasable mounting of cartridge 50 to actuator 10. Again, various push-on, push-off mechanisms are known in the art.

The gear arrangement 123 delivers the force of the motor 120 through the drive disk to drive shaft 183. Cavity 113 is for batteries.

Systems 5 and 105 are lightweight arrangements that afford both easy control of grinding or grating and the interchangeability of cartridges holding a material to be ground. Having separate grinding elements, outputs and holding containers, there is no cross-contamination in the grinding or grating apparatus.

For a grinding system that is manually operated, the actuator may be configured, for example, such that a top portion of the housing turns relative to the bottom portion, with the top turning section causing a rotation of a drive disk (26). The cartridges 50,150 and their releasable coupling, mount assembly and grinding elements, etc., may be the same whether automated or manual.

It should be noted that cartridges 50,150 are easy to fill with a to-be-ground substance because, with lid assembly 80,180 removed or not yet inserted, covers 52,152 have a large unobstructed "fill" opening. There is no center shaft through the cover to get in the way and the opening is relatively large, thus facilitating quick and clean filling, whether manual or automated.

Actuator 110 preferably includes a safety sensor 198 that disables activation without a cartridge mounted therein.

While the lid assembly and mount assembly are described herein as two separate assemblies (for teaching fabrication and use), to a user they may seem to be a singular assembly with two sections (lid and mount) that rotate relative to each other and have the grinding elements. This larger or "base" assembly (199 of FIG. 9) is coupled (fixedly or releasably) to the cover which then defines a volume for holding the substance to be ground.

It should be recognized that the term "grinding element" as used in the claim is intended to include a grinding element, grating element or other element that, in whole or part, reduces a larger item to smaller pieces thereof.

Furthermore, while a lid, mount and base assemblies are discussed above, it should be recognized that these are structures and depending on the fabrication method may have more or fewer individual parts, approaching in some instances, a single part that includes multiple components that were described individually above. Thus, the terms lid structure, mount structure and base structure are equally applicable to the lid, mount and base assemblies, respectively.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. An interchangeable cartridge device, comprising:
a container that defines a volume to hold a substance to be ground or grated;
a first assembly coupled to the container in a manner that affords rotational movement of the container and first assembly relative to one another;
a first grinding element associated with the container, and a second grinding element associated with the first assembly, the first and second grinding elements arranged proximate one another and defining a space therebetween that, in use, is an output of the container;
a bias member that biases one of the first and second grinding elements away from the other; and
a releasable attachment structure coupled to an exterior of the cartridge device that is adapted to afford releasable attachment of the cartridge device to a complementary configured actuator;
wherein the first grinding element moves relative to the second grinding element in a manner proportional to the movement of the container relative to the first assembly; and
wherein the bias member biases away from the container such that the one of the first and second grinding elements that is biased away from the other is biased away from the container.

2. The device of claim 1, further comprising a drive force receiving structure located at an exterior of the cartridge device and adapted to engage a drive mechanism of a complementary configured actuator in a manner such that, when engaged, a driving force from that actuator causes the rotational movement of one of the container and the first assembly relative to the other.

3. The device of claim 2, wherein the bias member is located between the drive force receiving structure and the one of the first and second grinding elements that is biased away from the other.

4. The device of claim 1, wherein the container includes a housing cover and a second assembly, the second assembly moving in concert with the housing cover, during grinding, and configured to structurally support the first grinding element.

5. The device of claim 4, wherein the bias member is located, at least in part, within the second assembly and biases the first grinding element away from the second grinding element.

6. The device of claim 1, wherein, when the device is on a horizontal surface with the container above the first assembly, the bias member is positioned between, at least in part, a top portion of the container and the one of the first and second grinding elements that is biased away by the bias member.

7. The device of claim 1, wherein the bias member is located at least in part within the container.

8. The device of claim 7, wherein a majority of the bias member is located within the container.

9. The device of claim 1, wherein the second grinding element has a surface that is complementary to the first grinding element.

10. The device of claim 1, wherein the container includes a housing cover and a second assembly, and the second assembly is releasably coupled to the housing cover.

11. The device of claim 10, wherein the housing cover includes a first threaded structure and the second assembly includes a second threaded structure that is complementary with the first threaded structure to allow screwable mounting and release of the second assembly to and from, respectively, the housing cover.

12. The device of claim 10, wherein the first and second assemblies are configured such that, in use during grinding, the first and second assemblies rotate relative to one another; and
wherein the device further includes a release-remount structure that, when engaged by a user, impedes movement of the second assembly relative to the first assembly thus causing the first and second assemblies to both move relative to the housing cover, thus allowing a user to release the second assembly from the housing cover by moving the first assembly relative to the housing cover.

13. The device of claim 12, wherein, when the release-remount structure is engaged, the movement of the first assembly relative to the housing cover that allows release of the second assembly from the housing cover is rotational movement.

14. The device of claim 12, wherein the release-remount structure includes a least one of a first surface configuration associated with the second assembly and a second surface configuration associated with the first assembly, and that first or second surface configuration is radially aligned among the first and second assemblies to facilitate the imposition against movement of the second assembly relative to the first assembly that allows the second assembly to be released from the housing cover through movement of the first assembly relative to the housing cover.

15. The device of claim 12, wherein, when the release-remount structure is engaged, the first and second assemblies move together such that rotation of the first assembly relative to the housing cover causes a screwing-off and a screwing-on of the second assembly from and to, respectively, the housing cover, depending on the direction that first assembly is screwed relative to the housing cover.

16. An interchangeable cartridge device, comprising:
a container that defines a volume to hold a substance to be ground or grated, the container including a housing cover and a second assembly;
a first assembly coupled to the container in a manner that affords rotational movement of the container and first assembly relative to one another;

a first grinding element associated with the container, and a second grinding element associated with the first assembly, the first and second grinding elements arranged proximate one another and defining a space therebetween that is an output of the container; and a releasable attachment structure coupled to an exterior of the cartridge device that affords releasable attachment of the cartridge device to a complementary configured actuator; and a bias member that biases the first grinding element away from the second assembly, and away from the second grinding element;

wherein the first grinding element moves relative to the second grinding element as the container moves relative to the first assembly; and wherein the second assembly is releasably coupled to the housing cover.

17. The device of claim 16, further comprising a drive force receiving structure coupled to an exterior of the cartridge device and adapted to engage a drive mechanism of a complementary configured actuator in a manner such that a driving force from that actuator causes the rotational movement of one of the container and the first assembly relative to the other.

18. The device of claim 16, wherein the housing cover includes a first threaded structure and the second assembly includes a second threaded structure that is complementary to the first threaded structure to allow screwable mounting and release of the second assembly to and from, respectively, the housing cover.

19. The device of claim 16, wherein the second assembly has a drive shaft structure that extends towards the first assembly and positions the first grinding element proximate that second grinding element; and wherein the device further includes a bias member provided about the drive shaft that biases the first grinding element away from the second grinding element.

20. The device of claim 16, wherein the first and second assemblies are configured such that, in use during grinding, the first and second assemblies rotate relative to one another; and wherein the device further includes a release-remount structure that, when engaged by a user, impedes movement of the second assembly relative to the first assembly allowing a user to release the second assembly from the housing cover by moving the first assembly relative to the housing cover.

21. The device of claim 20, wherein the release-remount structure includes a first surface configuration associated with the second assembly and a second surface configuration associated with the first assembly, and the first and second surface configurations align radially when the release-remount structure is engaged.

22. The device of claim 20, wherein, when the release-remount structure is engaged, the first and second assemblies move together such that rotation of the first assembly relative to the housing cover causes a screwing-off and a screwing-on of the second assembly from and to, respectively, the housing cover, depending on the direction that first assembly is screwed relative to the housing cover.

23. The device of claim 16, wherein the second grinding element has a surface that is complementary to the first grinding element.

24. An interchangeable cartridge device, comprising:
a container that defines a volume to hold a substance to be ground or grated, the container including a housing cover and a second assembly;

a first assembly coupled to the container in a manner that affords rotational movement of the first assembly and container relative to one another;

a first grinding element associated with the container, and a second grinding element associated with the first assembly, the first and second grinding elements arranged proximate one another and defining a space therebetween that is an output of the container; and a releasable attachment structure coupled to an exterior of the cartridge device that affords releasable attachment of the cartridge device to a complementary configured actuator; and a bias member that biases the first grinding element away from the second assembly, and away from the second grinding element;

wherein the first grinding element moves relative to the second grinding element as the first assembly moves relative to the container; and wherein the second assembly is releasably coupled to the housing cover.

25. The device of claim 24, further comprising a drive force receiving structure coupled to an exterior of the cartridge device and adapted to engage a drive mechanism of a complementary configured actuator in a manner such that a driving force from that actuator causes the rotational movement of one of the first assembly and the container relative to the other.

26. The device of claim 24, wherein the housing cover includes a first threaded structure and the second assembly includes a second threaded structure that is complementary to the first threaded structure to allow screwable mounting and release of the second assembly to and from, respectively, the housing cover.

27. An interchangeable cartridge device, comprising:
a container that defines a volume to hold a substance to be ground or grated;

a first assembly coupled to the container in a manner that affords rotational movement of the container and first assembly relative to one another;

a first grinding element associated with the container, and a second grinding element associated with the first assembly, the first and second grinding elements arranged proximate one another and defining a space therebetween that, in use, is an output of the container;

a bias member that biases one of the first and second grinding elements away from the other; and a releasable attachment structure coupled to an exterior of the cartridge device that is adapted to afford releasable attachment of the cartridge device to a complementary configured actuator;

wherein the first grinding element moves relative to the second grinding element in a manner proportional to the movement of the container relative to the first assembly; and wherein, when the device is on a horizontal surface with the container above the first assembly, the bias member is positioned, in majority part, between a top portion of the container and the one of the first and second grinding elements that is biased by the bias member.

28. An interchangeable cartridge device, comprising:
a container housing;
a drive force receiving structure located at an exterior of the container housing and adapted to engage a drive mechanism of a complementary configured actuator in a manner such that, when engaged, a driving force from that actuator causes rotational movement of the drive force receiving structure;

an assembly coupled to the container housing that defines therewith a volume to hold a substance to be ground or grated;

a support structure coupled to the assembly that supports a shaft segment;

a first grinding element coupled towards an exterior end of the shaft segment and a second grinding element associated with the assembly, the first and second grinding elements arranged proximate one another and defining an opening therebetween that is an output for substance held within the container housing; and a bias member that biases the first grinding element outwardly away from an interior of the container housing;

wherein the cartridge device is configured such that rotation of the drive force receiving structure causes rotation of the shaft segment which in turn causes rotation of the first grinding element relative to the second grinding element.

29. The device of claim 28, wherein the bias member is provided about the shaft segment.

30. The device of claim 28, wherein the assembly defines an output opening at which the second grinding element is provided, and the shaft segment traverses, at least in part, this output opening to hold the first grinding element proximate the second grinding element.

* * * * *